United States Patent
Gaspar Cuevas (10) Patent No.: US 9,647,993 B2
(45) Date of Patent: May 9, 2017

(54) MULTI-REPOSITORY KEY STORAGE AND SELECTION

(75) Inventor: José Gaspar Cuevas, Barcelona (ES)

(73) Assignee: EVOLIUM TECHNOLOGIES, S.L., Barcelona (ES)

(*) Notice: Subject to any disclaimer, the term of this patent is extended or adjusted under 35 U.S.C. 154(b) by 414 days.

(21) Appl. No.: 14/351,532

(22) PCT Filed: Oct. 13, 2011

(86) PCT No.: PCT/EP2011/067909
§ 371 (c)(1),
(2), (4) Date: Oct. 15, 2014

(87) PCT Pub. No.: WO2013/053393
PCT Pub. Date: Apr. 18, 2013

(65) Prior Publication Data
US 2015/0082041 A1    Mar. 19, 2015

(51) Int. Cl.
*H04L 9/32*     (2006.01)
*H04L 29/06*    (2006.01)
*H04L 9/08*     (2006.01)

(52) U.S. Cl.
CPC .......... *H04L 63/0428* (2013.01); *H04L 9/083* (2013.01); *H04L 63/061* (2013.01); *H04L 9/08* (2013.01); *H04L 9/0819* (2013.01)

(58) Field of Classification Search
CPC ......... H04L 9/08; H04L 9/0819; H04L 9/083; H04L 63/061; H04L 63/0428
See application file for complete search history.

(56) References Cited

U.S. PATENT DOCUMENTS

2002/0071560 A1    6/2002  Kurn et al.
2002/0184217 A1*  12/2002  Bisbee .................... G06F 21/33
(Continued)

FOREIGN PATENT DOCUMENTS

EP    1755269 A1    2/2007
JP    EP 1755269 A1 *  2/2007  ........... H04L 9/0858
WO   WO0065766 A2    11/2000

OTHER PUBLICATIONS

Cryptosign Server product feature brochure, "Electronic Signature Server", Realsec, downloaded Oct. 13, 2011, from website: http://www.realsec.com/pdfProEn/CryptoSignServer-technical-information.pdf.
(Continued)

*Primary Examiner* — Jayesh Jhaveri
(74) *Attorney, Agent, or Firm* — Peter B. Scull; Hamilton, DeSanctis & Cha LLP (57) ABSTRACT

System for performing a cryptographic operation, comprising a client system and a server system; said server comprising a multi-repository manager, repositories of cryptographic keys, a processor and a memory; and said client comprising a processor and a memory; wherein said two memories store computer executable instructions that, when executed, cause the client and the server to perform a method comprising: the client sending a request of the cryptographic operation to the server; the multi-repository manager obtaining a set of references to cryptographic keys allowed to the request from the repositories of cryptographic keys; the multi-repository manager establishing a cryptographic key referenced in said set of references as the cryptographic key to be used; the multi-repository manager requesting performance of the cryptographic operation to the repository wherein the cryptographic key to be used is stored; the multi-repository manager obtaining the result of the cryptographic operation from the repository that has
(Continued)

performed the cryptographic operation; and the server sending the result of the cryptographic operation to the client.

19 Claims, 1 Drawing Sheet

(56) References Cited

U.S. PATENT DOCUMENTS

| | | | |
|---|---|---|---|
| 2003/0021417 A1* | 1/2003 | Vasic | G06F 17/30067 380/277 |
| 2003/0142824 A1* | 7/2003 | Asano | G06F 21/10 380/277 |
| 2005/0071632 A1 | 3/2005 | Pauker et al. | |
| 2006/0062392 A1* | 3/2006 | Lee | H04L 9/0852 380/278 |
| 2006/0093149 A1* | 5/2006 | Zhu | H04L 63/0442 380/277 |
| 2007/0073937 A1* | 3/2007 | Feinberg | G06F 9/445 710/62 |
| 2015/0088754 A1* | 3/2015 | Kirsch | G06Q 20/0855 705/71 |

OTHER PUBLICATIONS

Cryptosign Server technical information brochure, "CryptoSignServer Technical Information", Realsec, downloaded Oct. 13, 2011, from website:http://www.realsec.com/pdfProEn/CryptosignServer.pdf.
International Search Report (ISR) and Written Opinion, International Application No. PCT/EP2011/067909 International Filing Date Oct. 13, 2011, Date of Mailing ISR Jun. 26, 2012, 4 pages, European Patent Office, Rijswijk Netherlands.

* cited by examiner

MULTI-REPOSITORY KEY STORAGE AND SELECTION

The present invention relates to a method of performing a cryptographic operation, and to a system suitable for carrying out such a method.

The invention also refers to a method of obtaining a result of a cryptographic operation in a client computer system, and to a computer program product and a client computer system suitable for carrying out such a method.

The invention further refers to a method of providing a result of a cryptographic operation from a server computer system, and to a computer program product and a server computer system suitable for carrying out such a method.

BACKGROUND ART

In order to identify a Company or an Individual in the digital world there exist different types of cryptographic keys that permit, for example, the use of digital certificates emitted and authorized by enabled authorities such as Verisign, Thawtee and many others. These digital certificates enable their related user/owner to perform cryptographic signing and/or authentication operations on behalf of the owner/user of the certificate, in such a way that said owner/user may digitally represent him/herself or his/her company in a wide range of different types of electronic operations.

These electronic operations may comprise simple identity validation in non-critical business transactions, as e.g. for obtaining access to a website or to an intranet or any other corporative system, but, on the other hand, these electronic operations may comprise critical identity validation in privileged operations that can legally compromise the whole company. Thus, it seems to be very important for a company to have under control all or at least part of the cryptographic keys that may be used by the employees in the digital world. In big organizations, for example, thousands of certificates may be available for the employees.

Some known platforms allow performing cryptographic operations with digital certificates that are locally installed in end-user computers. But, such a dispersion of cryptographic keys makes it difficult to avoid and/or detect in a reasonable period of time wrong and/or malicious uses of some of said certificates, which, as commented before, may compromise the whole company.

Systems trying to avoid such an inexistent and/or deficient control of cryptographic keys are known, said systems being based on the principle of centrally storing and managing certificates. For example, in the URLs http://www.realsec.com/pdfProEn/CryptoSignServer-technical-information-.pdf and http://www.realsec.com/pdfProEn/Cryptosign-Server.pdf, it is described a Realsec's hardware/software platform that provides a centralized secure repository of certificates, which ensures security on the processes of electronic signature and validation in computer systems-oriented services. This secure repository of certificates is a HSM (Hardware Security Module) with very high security capabilities.

This Realsec's system permits to an organization storing cryptographic keys remotely in a centralized way for better supervision, which overcomes the disadvantages derived from having the cryptographic keys of the company locally stored in end-user computers and, thus, dispersed into a plurality of end-user computers. Moreover, the Realsec's system offers very strong security functionalities based on the mentioned HSM for all the keys that remains in the system.

Nevertheless, the Realsec's system has the drawback of not having a good equilibrium between the provided centralized storing/management capabilities and the provided security capabilities. A company normally has different types of cryptographic keys with different levels of critical nature, so that the cost of maintaining the most critical keys in the Realsec's system may be justifiable, but the cost of maintaining less critical keys in the Realsec's system may not be reasonable at all. In other words, the Realsec's system may be functionally suitable for centralizing storage and management of all the certificates of the company, but, at the same time, may provide excessively strong security functionalities for some of the certificates, such as those having a low level of critical nature, in which case it may be unnecessarily expensive to keep and manage said less critical certificates in the Realsec's system.

SUMMARY OF THE INVENTION

There thus exists a need for new systems, methods and computer programs products for performing cryptographic operations under a centralized basis but offering a better equilibrium between centralizing capabilities and security capabilities in the terms previously described.

The object of the present invention is to fulfil such a need.

In a first aspect, the present invention provides a method of providing a result of a cryptographic operation from a server computer system, said method comprising: the server computer system, which comprises a multi-repository manager and at least one repository of remote cryptographic keys, receiving a user request of the cryptographic operation from a client computer system; the multi-repository manager obtaining a set of references to remote cryptographic keys allowed to the user request from the at least one repository of remote cryptographic keys; the multi-repository manager establishing a remote cryptographic key referenced in the set of references to remote cryptographic keys as the remote cryptographic key to be used for performing the cryptographic operation; the multi-repository manager requesting performance of the cryptographic operation to the repository wherein the remote cryptographic key to be used is stored, said cryptographic operation to be performed by using said remote cryptographic key; the multi-repository manager obtaining the result of the cryptographic operation from the repository of remote cryptographic keys that has performed the cryptographic operation; and the server computer system sending the result of the cryptographic operation to the client computer system.

The concept "client computer system" in the context of the present invention must be understood as a computer system comprising means for requesting cryptographic operations to another computer system and means for receiving results of cryptographic operations from said another computer system. And the concept "server computer system" must be understood as a computer system comprising means for receiving requests of cryptographic operations, means for performing said cryptographic operations and means for returning results of the performed cryptographic operations to "client computer systems". Thus, for example, a computer system that acts as a server of other services, e.g. a web server, may be a "client computer system" in the context of the present invention, and a computer system that acts as a client of other services, e.g. a web client, may be a "server computer system" in the context of the present invention.

The meaning of the term "system" may refer to a set of hardware elements, as e.g. a set of computers, comprising the necessary means for interacting between them. For instance, the "server computer system" may comprise a first computer comprising the multi-repository manager and a second computer comprising the at least one repository of cryptographic keys, said first and second computers being connected between them in such a way that said first and second computers may interact conveniently.

The method of providing a result of a cryptographic operation from a server computer system, and particularly the provision of the multi-repository manager and its role in said method, permits to have stored each cryptographic key in a suitable repository, in such a way that said repository may offer the strictly necessary security capabilities in accordance with the critical nature of the keys that are stored in said repository. Thus, for example, in the case of a company having cryptographic keys of two critical nature categories (e.g. critical and non-critical), a highly secure repository (e.g. a HSM) may be used to store critical keys and a conventional database may be used to store non-critical keys.

With this configuration, all the keys of the company can be centrally stored and used in said different repositories, which are centrally managed by the multi-repository manager. Moreover, particular security capabilities are provided for each stored key depending on the repository in which the key is stored, in such a way that e.g. the HSM of the previous example may be sized according to the quantity of critical keys of the company and, thus, the cost of centrally storing all the keys (critical and non-critical) of the company may be optimized, since storage of non-critical keys in an expensive HSM is avoided.

Furthermore, as the multi-repository manager has the capability of managing different types of repositories, a current repository may be easily substituted by another type of secure repository with a very low impact in the normal operation of the systems of the company. In the case of the multi-repository manager still not supporting the new secure repository to be integrated in the systems of the company, only a new module for interacting with said new repository will be necessary to develop as a new part of the multi-repository manager, so even in this case the impact of such an evolution in the normal operation of the systems of the company will be still quite low.

Thus, taking into account the previous argumentations, it may be concluded that this method of providing a result of a cryptographic operation from a server computer system allows having a very high flexibility that permits potentially cheaper evolutions of the systems of the company (e.g. in the server computer system), both in terms of requiring conveniently sized secure repositories and, thus, without unnecessary and expensive security capabilities, and in terms of low impact adaptations in the current systems for integrating a new repository of certificates.

In a second aspect of the present invention, it is provided a computer program product comprising program instructions for causing a computer to perform the method of providing a result of a cryptographic operation from a server computer system. The invention also relates to such a computer program product embodied on a storage medium (for example, a CD-ROM, a DVD, a USB drive, on a computer memory or on a read-only memory) or carried on a carrier signal (for example, on an electrical or optical carrier signal).

According to a third aspect of the invention, it is provided a server computer system for providing a result of a cryptographic operation, the server computer system comprising a multi-repository manager, at least one repository of remote cryptographic keys, a processor and a memory; wherein the memory of the server computer system stores computer executable instructions that, when executed, cause the server computer system to perform a method comprising: the server computer system receiving a user request of the cryptographic operation from a client computer system; the multi-repository manager obtaining a set of references to remote cryptographic keys allowed to the user request from the at least one repository of remote cryptographic keys; the multi-repository manager establishing a remote cryptographic key referenced in the set of references to remote cryptographic keys as the remote cryptographic key to be used for performing the cryptographic operation; the multi-repository manager requesting performance of the cryptographic operation to the repository wherein the remote cryptographic key to be used is stored, said cryptographic operation to be performed by using said remote cryptographic key; the multi-repository manager obtaining the result of the cryptographic operation from the repository of remote cryptographic keys that has performed the cryptographic operation; and the server computer system sending the result of the cryptographic operation to the client computer system.

In a fourth aspect of the present invention, it is provided a server computer system for providing a result of a cryptographic operation, comprising: computing means for receiving a user request of the cryptographic operation from a client computer system; computing means for sending the result of the cryptographic operation to the client computer system; at least one repository of remote cryptographic keys; and a multi-repository manager. Said multi-repository manager comprising: computing means for obtaining a set of references to remote cryptographic keys allowed to the user request from the at least one repository of remote cryptographic keys; computing means for establishing a remote cryptographic key referenced in the set of references to remote cryptographic keys as the remote cryptographic key to be used for performing the cryptographic operation; computing means for requesting performance of the cryptographic operation to the repository wherein the remote cryptographic key to be used is stored, said cryptographic operation to be performed by using said remote cryptographic key; and computing means for obtaining the result of the cryptographic operation from the repository of remote cryptographic keys that has performed the cryptographic operation.

The computer program product of the second aspect, the server computer system of the third aspect, and the server computer system of the fourth aspect of the invention are suitable for carrying out the method of providing a result of a cryptographic operation from a server computer system, said method having been previously commented as the first aspect of the invention. Therefore, all the advantages and principles commented in relation to said method (first aspect of the invention) are also attributable to said computer program product (second aspect of the invention), and to said two server computer systems (third and fourth aspects of the invention).

According to a fifth aspect of the invention, it is provided a method of obtaining a result of a cryptographic operation in a client computer system, said method comprising: the client computer system sending a user request of the cryptographic operation to a server computer system comprising a multi-repository manager and at least one repository of remote cryptographic keys; and the client computer system receiving the result of the cryptographic operation from the server computer system, wherein said received result of the cryptographic operation is the result of: the multi-repository manager obtaining a set of references to remote cryptographic keys allowed to the user request from the at least one repository of remote cryptographic keys; the multi-repository manager establishing a remote cryptographic key referenced in the set of references to remote cryptographic keys as the remote cryptographic key to be used for performing the cryptographic operation; the multi-repository manager requesting performance of the cryptographic operation to the repository wherein the remote cryptographic key to be used is stored, said cryptographic operation to be performed by using said remote cryptographic key; and the multi-repository manager obtaining the result of the cryptographic operation from the repository of remote cryptographic keys that has performed the cryptographic operation.

This method of obtaining a result of a cryptographic operation in a client computer system permits to said client computer system obtaining the result of the cryptographic operation in such a way that all the advantages and principles commented in relation to the method of providing a result of a cryptographic operation from a server computer system (first aspect of the invention) are also of consideration in this case.

In a sixth aspect of the present invention, it is provided a computer program product comprising program instructions for causing a computer to perform the method of obtaining a result of a cryptographic operation in a client computer system. The invention also relates to such a computer program product embodied on a storage medium (for example, a CD-ROM, a DVD, a USB drive, on a computer memory or on a read-only memory) or carried on a carrier signal (for example, on an electrical or optical carrier signal).

According to a seventh aspect of the present invention, it is provided a client computer system for obtaining a result of a cryptographic operation in the client computer system, the client computer system comprising a processor and a memory; wherein the memory of the client computer system stores computer executable instructions that, when executed, cause the client computer system to perform a method comprising: the client computer system sending a user request of the cryptographic operation to a server computer system comprising a multi-repository manager and at least one repository of remote cryptographic keys; and the client computer system receiving the result of the cryptographic operation from the server computer system. Said received result of the cryptographic operation being the result of: the multi-repository manager obtaining a set of references to remote cryptographic keys allowed to the user request from the at least one repository of remote cryptographic keys; the multi-repository manager establishing a remote cryptographic key referenced in the set of references to remote cryptographic keys as the remote cryptographic key to be used for performing the cryptographic operation; the multi-repository manager requesting performance of the cryptographic operation to the repository wherein the remote cryptographic key to be used is stored, said cryptographic operation to be performed by using said remote cryptographic key; and the multi-repository manager obtaining the result of the cryptographic operation from the repository of remote cryptographic keys that has performed the cryptographic operation.

In an eighth aspect of the present invention, it is provided a client computer system for obtaining a result of a cryptographic operation in the client computer system, comprising: computing means for sending a user request of the cryptographic operation to a server computer system comprising a multi-repository manager and at least one repository of remote cryptographic keys; and computing means for receiving the result of the cryptographic operation from the server computer system. Said received result of the cryptographic operation being the result of: the multi-repository manager obtaining a set of references to remote cryptographic keys allowed to the user request from the at least one repository of remote cryptographic keys; the multi-repository manager establishing a remote cryptographic key referenced in the set of references to remote cryptographic keys as the remote cryptographic key to be used for performing the cryptographic operation; the multi-repository manager requesting performance of the cryptographic operation to the repository wherein the remote cryptographic key to be used is stored, said cryptographic operation to be performed by using said remote cryptographic key; and the multi-repository manager obtaining the result of the cryptographic operation from the repository of remote cryptographic keys that has performed the cryptographic operation.

The computer program product of the sixth aspect, the client computer system of the seventh aspect, and the client computer system of the eighth aspect of the invention are suitable for carrying out the method of obtaining a result of a cryptographic operation in a client computer system, said method having been previously commented as the fifth aspect of the invention. Therefore, all the advantages and principles considered with respect to said method (fifth aspect of the invention) are also attributable to said computer program product (sixth aspect of the invention), and to said two client computer systems (seventh and eighth aspects of the invention).

According to the present invention, it is provided a method of performing a cryptographic operation, said method comprising: a client computer system sending a user request of the cryptographic operation to a server computer system comprising a multi-repository manager and at least one repository of remote cryptographic keys; the multi-repository manager obtaining a set of references to remote cryptographic keys allowed to the user request from the at least one repository of remote cryptographic keys; the multi-repository manager establishing a remote cryptographic key referenced in the set of references to remote cryptographic keys as the remote cryptographic key to be used for performing the cryptographic operation; the multi-repository manager requesting performance of the cryptographic operation to the repository wherein the remote cryptographic key to be used is stored, said cryptographic operation to be performed by using said remote cryptographic key; the multi-repository manager obtaining the result of the cryptographic operation from the repository of remote cryptographic keys that has performed the cryptographic operation; and the server computer system sending the result of the cryptographic operation to the client computer system.

According to the present invention, it is provided a system for performing a cryptographic operation, comprising at least one client computer system and a server computer system; wherein the server computer system comprises a multi-repository manager, at least one repository of remote cryptographic keys, a processor and a memory; wherein the client computer system comprises a processor and a memory; and wherein the memory of the server computer system and the memory of the client computer system store computer executable instructions that, when executed, cause the client and the server computer systems to perform a method comprising: the client computer system sending a user request of the cryptographic operation to the server computer system; the multi-repository manager obtaining a set of references to remote cryptographic keys allowed to the user request from the at least one repository of remote cryptographic keys; the multi-repository manager establishing a remote cryptographic key referenced in the set of references to remote cryptographic keys as the remote cryptographic key to be used for performing the cryptographic operation; the multi-repository manager requesting performance of the cryptographic operation to the repository wherein the remote cryptographic key to be used is stored, said cryptographic operation to be performed by using said remote cryptographic key; the multi-repository manager obtaining the result of the cryptographic operation from the repository of remote cryptographic keys that has performed the cryptographic operation; and the server computer system sending the result of the cryptographic operation to the client computer system.

According to the present invention, it is provided a system for performing a cryptographic operation, comprising at least one client computer system and a server computer system. The client computer system comprising: computing means for sending a user request of the cryptographic operation to the server computer system; and computing means for receiving the result of the cryptographic operation from the server computer system. The server computer system comprising: computing means for receiving the user request of the cryptographic operation from the client computer system; computing means for sending the result of the cryptographic operation to the client computer system; at least one repository of remote cryptographic keys; and a multi-repository manager. The multi-repository manager comprising: computing means for obtaining a set of references to remote cryptographic keys allowed to the user request from the at least one repository of remote cryptographic keys; computing means for establishing a remote cryptographic key referenced in the set of references to remote cryptographic keys as the remote cryptographic key to be used for performing the cryptographic operation; computing means for requesting performance of the cryptographic operation to the repository wherein the remote cryptographic key to be used is stored, said cryptographic operation to be performed by using said remote cryptographic key; and computing means for obtaining the result of the cryptographic operation from the repository of remote cryptographic keys that has performed the cryptographic operation.

Throughout the description and claims the word "comprise" and variations of the word, are not intended to exclude other technical features, additives, components, or steps. Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred embodiments described herein.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

In the following descriptions, numerous specific details are set forth in order to provide a thorough understanding of the present invention. It will be understood, however, by one skilled in the art, that the present invention may be practiced without some or all of these specific details. In other instances, well known elements have not been described in detail in order not to unnecessarily obscure the description of the present invention.

Figure 1:
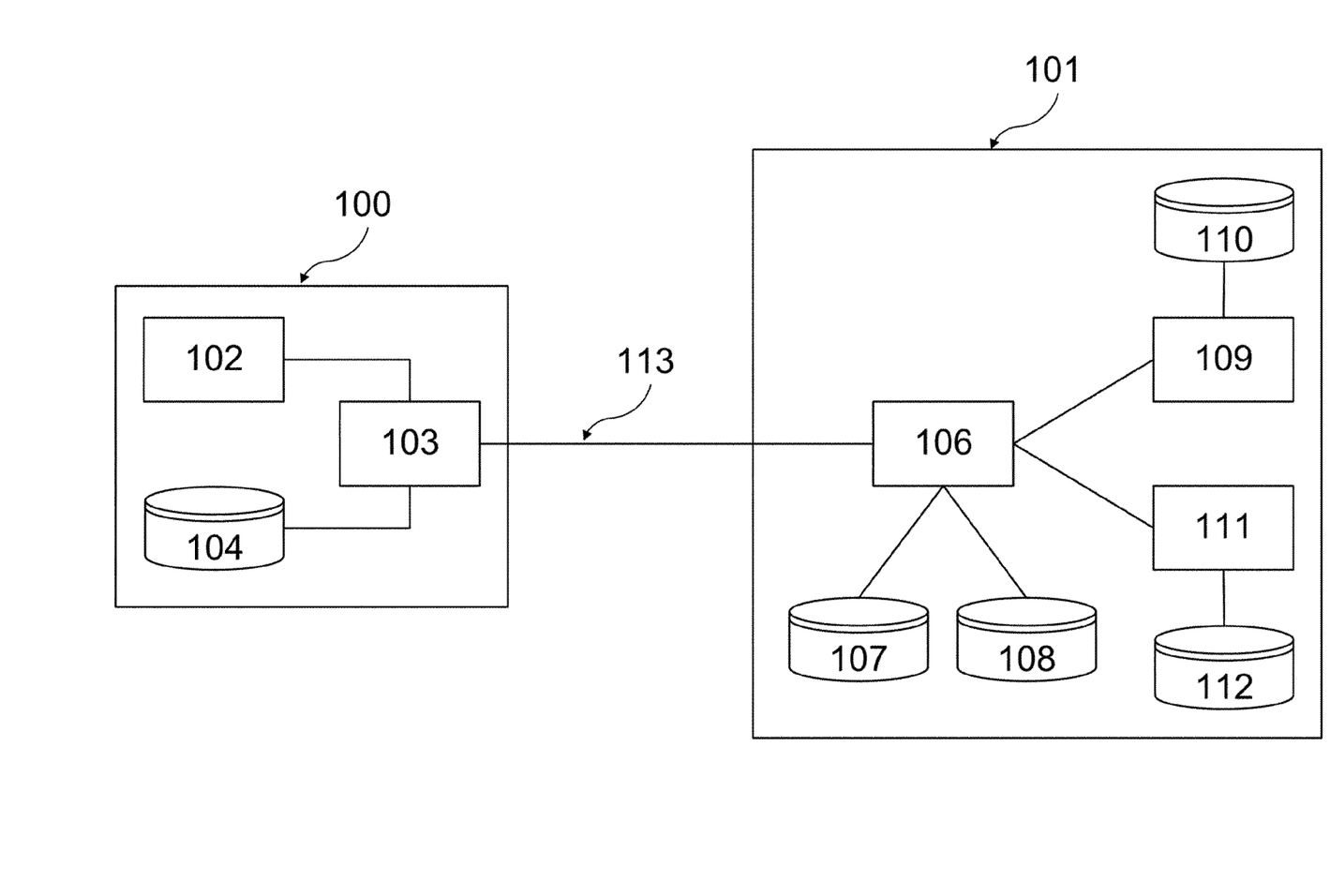
The FIGURE is a schematic representation of a system for performing cryptographic operations, according to an embodiment of the invention.

The FIGURE depicts an embodiment of the system for performing cryptographic operations, said embodiment comprising at least one client computer system 100 and a server computer system 101 connected through a communications network 113.

The server computer system 101 may comprise:
a multi-repository manager 106;
a first repository 107 of remote cryptographic keys;
a second repository 108 of remote cryptographic keys;
a context-of-use module 109;
a repository of context-of-use rules 110;
a cryptographic events module 111;
a repository of cryptographic events 112;
a processor (not shown); and
a memory (not shown).

The multi-repository manager 106 may be adapted to receive data (e.g. requests of cryptographic operations) from a client module 103 of the client computer system 100, to interact with the first repository 107 and the second repository 108 of remote cryptographic keys for e.g. performing requested cryptographic operations, and to send data (e.g. results of performed cryptographic operations) to the client module 103.

Interchange of data between the client module 103 and the multi-repository manager 106 through the communications network 113 may be performed by structuring said data according to a suitable repository-independent structure, by conveniently packing said repository-independent structured data for reasons of efficiency in transmissions, and by using a secure channel (e.g. a SSL channel) for reasons of security in transmissions. Thus, for example, the client module 103 may send data of requests of cryptographic operations structured under said suitable repository-independent structure and packed under a suitable packaging structure and using said SSL channel. Equally, the multi-repository manager 106 may send data of results of cryptographic operations structured under said suitable repository-independent structure and packed under said suitable packaging structure and using said SSL channel.

Therefore, said interchange of data structured under said suitable repository-independent structure may be understood as the client module 103 and the multi-repository manager 106 using a unique repository-independent language for communicating between them.

The multi-repository manager 106 may comprise a repository-independent module for receiving packed data from the client module 103 and for unpacking said data once received, said unpacked data having the repository-independent structure commented before. The multi-repository manager 106 may further comprise a repository-dependent module for each type of a plurality of different types of repositories of cryptographic keys, the first repository 107 and the second repository 108 being of one of said types of repositories, in such a way that one of the repository-dependent modules is adapted to interact with the first repository 107 and one of the repository-dependent modules is adapted to interact with the second repository 108.

Each of the repository-dependent modules may be adapted to obtain unpacked data from the repository-independent module, and to transform said unpacked data into corresponding instructions to be executed in the corresponding repository of cryptographic keys. Equally, each of said repository-dependent modules may be adapted to obtain data produced in the corresponding repository of cryptographic keys, and to transform said obtained data into the repository-independent structure previously commented. The repository-independent module may be further adapted to obtain data from the repository-dependent modules, said data being structured under the repository-independent structure, to pack said obtained data under the suitable packaging structure, and to send said packed data to the client module 103.

The previously described functionalities with respect to the repository-dependent modules may be understood as the multi-repository manager 106 using a repository-dependent language for interacting with each different type of repositories of cryptographic keys (first repository 107 and second repository 108 in the embodiment of the FIGURE). Therefore, the configuration of the multi-repository manager 106 based on the repository-independent module and the repository-dependent modules permits integrating new types of repositories with a very low impact in the system.

The first repository 107 may be a highly secure HSM for storing keys of high critical nature, whereas the second repository 108 may be a conventional data base for storing keys of low critical nature. However, the server computer system 101 may comprise further repositories of remote cryptographic keys depending on the different levels of critical nature of the existing remote cryptographic keys. For example, the server computer system 101 could comprise a third repository for storing keys of medium critical nature.

The context-of-use module 109 may be adapted to interact with the multi-repository manager 106 for determining remote cryptographic keys allowed to the user of received request of cryptographic operations, said determination of allowed keys being according to the content of the repository of context-of-use rules 110. The concept "context-of-use" refers to the contextual conditions under which a cryptographic operation has been requested and to permitting or refusing the use of a particular remote cryptographic key depending on said contextual conditions.

The cryptographic events module 111 may be adapted to store in the repository of cryptographic events 112 data related to any kind of cryptographic events occurred in the server computer system 101 for e.g. later inspection. Said data related to cryptographic events may comprise data related to results of cryptographic operations obtained by the multi-repository manager 106, data related to requests received by the multi-repository manager 106, etc.

The memory of the server computer system 101 may store a computer program comprising executable instructions that, when executed by the processor, cause the server computer system 101 to perform a method of providing a result of a cryptographic operation, said method comprising:
    the multi-repository manager 106 receiving a user request of the cryptographic operation from the client module 103;
    the multi-repository manager 106 obtaining a set of references to remote cryptographic keys allowed to the user request from the first 107 and second 108 repositories of remote cryptographic keys;
    the multi-repository manager 106 establishing a remote cryptographic key referenced in the set of references to remote cryptographic keys as the remote cryptographic key to be used for performing the cryptographic operation;
    the multi-repository manager 106 requesting performance of the cryptographic operation to the repository (first 107 or second 108) wherein the remote cryptographic key to be used is stored, said cryptographic operation to be performed by using said remote cryptographic key;
    the multi-repository manager 106 obtaining the result of the cryptographic operation from the repository (first 107 or second 108) of remote cryptographic keys that has performed the cryptographic operation;
    the multi-repository manager 106 sending the result of the cryptographic operation to the client module 103.

In the context described in the previous paragraph, the multi-repository manager 106, the context-of-use module 109 and the cryptographic events module 111 may be sub-modules (e.g. subroutines) of the computer program stored in the memory of the server computer system 101.

The client computer system 100 may comprise:
    a client module 103;
    a local repository 104 adapted to store local cryptographic keys;
    a processor (not shown); and
    a memory (not shown).

The client module 103 may be adapted to capture requests of cryptographic operations from one or more applications 102 running in the client computer system 100, to send each captured request to the multi-repository manager 106, and to receive each result of executed cryptographic operations from the multi-repository manager 106.

The memory of the client computer system 100 may store a computer program comprising executable instructions that, when executed by the processor, cause the client computer system to perform a method of obtaining a result of a cryptographic operation, said method comprising:
    the client module 103, which may be a sub-module (e.g. a subroutine) of said client's computer program, sending the user request of the cryptographic operation to the multi-repository manager 106;
    the client module 103 receiving the result of the cryptographic operation from the multi-repository manager 106, said received result being the result of the cryptographic operation obtained by the multi-repository manager 106, as previously described.

Consequently, the embodiment of the system shown in the FIGURE may perform a method of performing a cryptographic operation comprising:
    the client module 103 sending a user request of the cryptographic operation to the multi-repository manager 106;
    the multi-repository manager 106 obtaining a set of references to remote cryptographic keys allowed to the user request from the first 107 and second 108 repositories of remote cryptographic keys;
    the multi-repository manager 106 establishing a remote cryptographic key referenced in the set of references to remote cryptographic keys as the remote cryptographic key to be used for performing the cryptographic operation;
    the multi-repository manager 106 requesting performance of the cryptographic operation to the repository (first 107 or second 108) wherein the remote cryptographic key to be used is stored, said cryptographic operation to be performed by using said remote cryptographic key;

the multi-repository manager 106 obtaining the result of the cryptographic operation from the repository (first 107 or second 108) of remote cryptographic keys that has performed the cryptographic operation;

the multi-repository manager 106 sending the result of the cryptographic operation to the client module 103.

Preferably, the method of performing a cryptographic operation may further comprise:

the multi-repository manager 106 sending the obtained set of references to remote cryptographic keys to the client module 103;

the client module 103 selecting a reference of the set of references to remote cryptographic keys according to a user request for selecting remote cryptographic keys;

the client module 103 sending the selected reference to remote cryptographic key to the multi-repository manager 106;

and wherein the multi-repository manager 106 establishing a remote cryptographic key referenced in the set of references to remote cryptographic keys as the remote cryptographic key to be used for performing the cryptographic operation comprises:

the multi-repository manager 106 establishing the remote cryptographic key referenced by the selected reference to remote cryptographic key, received from the client module 103, as the remote cryptographic key to be used for performing the cryptographic operation.

Alternatively to the remote key selection criteria described in the previous paragraph, each stored remote cryptographic key may comprise a priority, so that the multi-repository manager may establish the remote cryptographic key to be used for performing the cryptographic operation by selecting the key with highest priority from the set of references to remote cryptographic keys allowed to the user request.

Alternatively to the remote key selection criteria described in the two previous paragraphs, each stored remote cryptographic key may comprise an end of validity date, so that the multi-repository manager may establish the remote cryptographic key to be used for performing the cryptographic operation by selecting the key with the most distant end of validity date from the set of references to remote cryptographic keys allowed to the user request.

In some embodiments of the invention, the method of performing a cryptographic operation may further comprise:

the client module 103 obtaining a set of references to local cryptographic keys allowed to the user request from the local repository 104;

the client module 103 establishing a local cryptographic key referenced in the set of references to local cryptographic keys as the local cryptographic key to be used for performing the cryptographic operation;

the client module 103 performing the cryptographic operation by using the local cryptographic key to be used for performing the cryptographic operation.

Preferably, the method of performing a cryptographic operation may further comprise:

the client module 103 selecting a reference of the set of references to local cryptographic keys according to a user request for selecting local cryptographic keys;

and wherein the client module 103 establishing a local cryptographic key referenced in the set of references to local cryptographic keys as the local cryptographic key to be used for performing the cryptographic operation comprises:

the client module 103 establishing the local cryptographic key referenced by the selected reference to local cryptographic key as the local cryptographic key to be used for performing the cryptographic operation.

Alternatively to the local key selection criteria described in the previous paragraph, each stored local cryptographic key may comprise a priority, so that the client module may establish the local cryptographic key to be used for performing the cryptographic operation by selecting the key with highest priority from the set of references to local cryptographic keys allowed to the user request.

Alternatively to the local key selection criteria described in the two previous paragraph, each stored local cryptographic key may comprise an end of validity date, so that the client module 103 may establish the local cryptographic key to be used for performing the cryptographic operation by selecting the key with the most distant end of validity date from the set of references to local cryptographic keys allowed to the user request.

The system giving the option to the user of also using local keys for performing cryptographic operations offers a very high flexibility to the system and related methods, since e.g. integration of a new repository in the system may require some keys to be temporary locally stored in client computer systems during a certain period of time, while e.g. the new repository has not been definitively integrated in the system. In other words, the use of keys locally stored may be especially advantageous during the transition from a situation in which said new repository has not been implanted to a situation in which said new repository has been implanted.

In embodiments of the invention, the multi-repository manager 106 may determine that a remote cryptographic key is allowed to the user request when said remote cryptographic key and the user request match a context-of-use rule stored in the repository of context-of-use rules 110, and said matched context-of-use rule comprises a resulting action that indicates permission to use the remote cryptographic key.

The use of context-of-use rules constitutes a very powerful tool for taking into account general corporative policies with respect to the use of certain types of certificates. For example, if the company determines that engineers can use particular types of certificates (e.g. keys for signing technical documents) only during particular periods of time (e.g. between 09:00 h and 18:00 h), this policy may be very easily implanted by creating a new context-of-use rule or by modifying an existing context-of-use rule reflecting such a logic. Thus, it may be concluded that the use of context-of-use rules adds even more flexibility to the system and related methods.

In embodiments of the invention, each context-of-use rule stored in the repository of context-of-use rules 110 may further comprise a user profile and a cryptographic key profile, and the multi-repository manager 106 may determine that a remote cryptographic key and the user request match a context-of-use rule when the user of the user request belongs to the user profile of said context-of-use rule and said remote cryptographic key belongs to the cryptographic key profile of said context-of-use rule.

For example, assuming the request of cryptographic operation, the set of potentially applicable cryptographic keys and the context-of-use rule indicated in Table 1, the key K2 will be established as the key to be used for performing the cryptographic operation, because the existing context-of-use rule 'keys of profile KP2 are permitted for users of profile UP1' is matched by the request (user profile=UP1)

and the key K2 (key profile=KP2) and said matched rule permits the use of the key (resulting action=permitted).

TABLE 1

| | |
|---|---|
| request of cryptographic operation | made by a user U1 belonging to the user profile UP1 |
| set of potentially applicable cryptographic keys | K1 belonging to the profile KP1<br>K2 belonging to the profile KP2 |
| existing context-of-use rules | 'keys of profile KP2 are permitted for users of profile UP1', wherein 'keys of the profile KP2' refers to the parameter cryptographic key profile, 'users of the profile UP1' refers to the parameter user profile and 'are permitted' refers to the parameter resulting action |

Examples of user profile may be:
ENGINEERS—employees of the company that are engineers
SYSTEMS—employees of the company that are systems technicians
Examples of cryptographic key profiles may be:
INTRANET—keys for accessing to the intranet of the company
APPROVAL—keys for signing approval of an internal document In some embodiments, each context-of-use rule stored in the repository of context-of-use rules 110 may further comprise a technical conditions profile, and the multi-repository manager 106 may determine that a remote cryptographic key and the user request match a context-of-use rule when the user of the user request belongs to the user profile of said context-of-use rule, said remote cryptographic key belongs to the cryptographic key profile of said context-of-use rule, and the technical conditions under which the user request has been performed belong to the technical conditions profile of said context-of-use rule.

The technical conditions profile may refer to at least one of the following parameters: time of the user request (i.e. time at which the user request has been made), profile of the client computer system (e.g. mobile device, corporate network device, etc.), location of the client computer system (e.g. in or out of the corporate network), and profile of the application through which the user request has been performed (e.g. Office, Acrobat, etc.).

For instance, assuming the request of cryptographic operation, the set of potentially applicable cryptographic keys and the existing context-of-use rule indicated in Table 2, the key K1 will be established as the key to be used for performing the cryptographic operation, because only the context-of-use rule 'keys of profile KP1 are permitted for users of profile UP1 between 09:00 h and 18:00 h' is matched by the request (user profile=UP1 and '10:31 h' is between '09:00 h and 18:00 h') and the key K1 (key profile=KP1), and said matched rule permits the use of the key (resulting action=permitted).

TABLE 2

| | |
|---|---|
| request of cryptographic operation | made by a user U1 belonging to the user profile UP1<br>made at 10:31 h |
| set of potentially applicable cryptographic keys | K1 belonging to the profile KP1<br>K2 belonging to the profile KP2 |

TABLE 2-continued

| | |
|---|---|
| existing context-of-use rules | 'keys of profile KP2 are permitted for users of profile UP1 between 13:00 h and 18:00 h'<br>'keys of profile KP1 are permitted for users of profile UP1 between 09:00 h and 18:00 h' |

In some embodiments, each context-of-use rule stored in the repository of context-of-use rules 110 may further comprise a priority, and the multi-repository manager 106 may determine that a remote cryptographic key is allowed to the user request when said remote cryptographic key and the user request match at least one context-of-use rule and the context-of-use rule of said matched at least one context-of-use rule having the highest priority comprises a resulting action that indicates permission to use the remote cryptographic key.

For example, assuming the request of cryptographic operation, the set of potentially applicable cryptographic keys and the existing context-of-use rules indicated in Table 3, the key K1 will be established as the key to be used for performing the cryptographic operation, because:
   the context-of-use rule 'keys of profile KP1 are not permitted for users of profile UP1 between 13:00 h and 18:00 h' is matched by the request (user profile=UP1 and '13:31 h' is between '09:00 h and 18:00 h') and the key K1 (key profile=KP1), said matched rule not permitting the use of the key (resulting action=not permitted);
   the context-of-use rule 'keys of profile KP1 are permitted for users of profile UP1 between 09:00 h and 18:00 h' is matched by the request (user profile=UP1 and '13:31 h' is between '09:00 h and 18:00 h') and the key K1 (key profile=KP1), said matched rule permitting the use of the key (resulting action=permitted);
   but the priority of the rule permitting the use of the key (priority 20) is higher than the priority of the rule not permitting the use of the key (priority 10), so the rule of priority 20 prevails over the rule of priority 10, so the use of the key K1 is permitted according to the rule 'keys of profile KP1 are permitted for users of profile UP1 between 09:00 h and 18:00 h'.

TABLE 3

| | |
|---|---|
| request of cryptographic operation | made by a user U1 belonging to the user profile UP1<br>made at 13:31 h |
| set of potentially applicable cryptographic keys | K1 belonging to the profile KP1<br>K2 belonging to the profile KP2 |
| existing context-of-use rules | 'keys of profile KP1 are not permitted for users of profile UP1 between 13:00 h and 18:00 h' - priority 10<br>'keys of profile KP1 are permitted for users of profile UP1 between 09:00 h and 18:00 h' - priority 20 |

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

Further, although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means.

When the program is embodied in a signal that may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A method of performing a cryptographic operation, comprising:
    a server computer system receiving from a client computer system a user request of a cryptographic operation, the server computer system comprising a multi-repository manager and a plurality of repositories for storing remote cryptographic keys in one or another repository depending on a critical nature of each of the remote cryptographic keys, wherein the plurality of repositories includes a secure repository for storing critical keys;
    the multi-repository manager obtaining a set of references to remote cryptographic keys allowed to the user request from the plurality of repositories of remote cryptographic keys;
    the multi-repository manager establishing a remote cryptographic key referenced in the set of references to remote cryptographic keys as the remote cryptographic key to be used for performing the cryptographic operation;
    the multi-repository manager requesting performance of the cryptographic operation to the repository wherein the remote cryptographic key to be used is stored depending on the critical nature of the remote cryptographic key, said cryptographic operation to be performed by using said remote cryptographic key;
    the multi-repository manager obtaining the result of the cryptographic operation from the repository of remote cryptographic keys that has performed the cryptographic operation;
    the server computer system sending the result of the cryptographic operation to the client computer system.

2. Method according to claim 1, further comprising:
    the server computer system sending the obtained set of references to remote cryptographic keys to the client computer system;
    the server computer system receiving from the client computer system a selected reference of the set of references to remote cryptographic keys according to a user request for selecting remote cryptographic keys;
    wherein the multi-repository manager establishing a remote cryptographic key referenced in the set of references to remote cryptographic keys as the remote cryptographic key to be used for performing the cryptographic operation comprises:
        the multi-repository manager establishing the remote cryptographic key referenced by the selected reference to remote cryptographic key, received from the client computer system, as the remote cryptographic key to be used for performing the cryptographic operation.

3. Method according to claim 1
    wherein the client computer system will have obtained a set of references to local cryptographic keys allowed to the user request from a repository of local cryptographic keys comprised in the client computer system;
    wherein the client computer system will have established a local cryptographic key referenced in the set of references to local cryptographic keys as the local cryptographic key to be used for performing the cryptographic operation;
    wherein the client computer system will have performed the cryptographic operation by using the local cryptographic key to be used for performing the cryptographic operation.

4. Method according to claim 3, further comprising:
    wherein the client computer system will have selected a reference of the set of references to local cryptographic keys according to a user request for selecting local cryptographic keys;
    and wherein establishment by the client computer system of a local cryptographic key referenced in the set of references to local cryptographic keys as the local cryptographic key to be used for performing the cryptographic operation comprises:
        that the client computer system will have established the local cryptographic key referenced by the selected reference to local cryptographic key as the local cryptographic key to be used for performing the cryptographic operation.

5. Method according to claim 1, wherein a remote cryptographic key is allowed to the user request when said remote cryptographic key and the user request match a context-of-use rule of a set of context-of-use rules, and said matched context-of-use rule comprises a resulting action that indicates permission to use the remote cryptographic key.

6. Method according to claim 5, wherein each context-of-use rule of the set of context-of-use rules further comprises a priority, and wherein a remote cryptographic key is allowed to the user request when said remote cryptographic key and the user request match at least one context-of-use rule and the context-of-use rule of said at least one context-of-use rule having the highest priority comprises a resulting action that indicates permission to use the remote cryptographic key.

7. Method according to claim 5, wherein each context-of-use rule further comprises a user profile and a cryptographic key profile, and wherein a remote cryptographic key and the user request match a context-of-use rule when the user of the user request belongs to the user profile of said context-of-use rule and said remote cryptographic key belongs to the cryptographic key profile of said context-of-use rule.

8. Method according to claim 7, wherein each context-of-use rule further comprises a technical conditions profile, and wherein a remote cryptographic key and the user request match a context-of-use rule when the user of the user request belongs to the user profile of said context-of-use rule, said remote cryptographic key belongs to the cryptographic key profile of said context-of-use rule, and the technical conditions under which the user request has been performed belong to the technical conditions profile of said context-of-use rule.

9. Method according to claim 8, wherein the technical conditions profile refers to at least one of the following parameters: time of the user request, profile of the client computer system, location of the client computer system, and profile of the application through which the user request has been performed.

10. Method according to claim 1, further comprising:
the multi-repository manager storing data related to each result of the cryptographic operation in a repository of cryptographic events.

11. Method according to claim 1, further comprising:
the multi-repository manager storing data related to the received user request in the repository of cryptographic events.

12. Computer program product comprising instructions stored on a non-transitory computer-readable media, for causing a computer to perform a method of performing a cryptographic operation, said method comprising:
a server computer system receiving from a client computer system a user request of a cryptographic operation, the server computer system comprising a multi-repository manager and a plurality of repositories for storing remote cryptographic keys in one or another repository depending on a critical nature of each of the remote cryptographic keys, wherein the plurality of repositories includes a secure repository for storing critical keys;
the multi-repository manager obtaining a set of references to remote cryptographic keys allowed to the user request from the plurality of repositories of remote cryptographic keys;
the multi-repository manager establishing a remote cryptographic key referenced in the set of references to remote cryptographic keys as the remote cryptographic key to be used for performing the cryptographic operation;
the multi-repository manager requesting performance of the cryptographic operation to the repository wherein the remote cryptographic key to be used is stored depending on the critical nature of the remote cryptographic key, said cryptographic operation to be performed by using said remote cryptographic key;
the multi-repository manager obtaining the result of the cryptographic operation from the repository of remote cryptographic keys that has performed the cryptographic operation;
the server computer system sending the result of the cryptographic operation to the client computer system.

13. A system for performing a cryptographic operation, comprising a server computer system; wherein the server computer system comprises a multi-repository manager, a plurality of repositories for storing remote cryptographic keys, a processor and a memory; wherein the remote cryptographic keys are stored in one or another of the repositories depending on a critical nature of each of the remote cryptographic keys, and the plurality of repositories includes a secure repository for storing critical keys; and wherein the memory of the server computer system stores computer executable instructions that, when executed, cause the server computer systems to perform a method comprising:
the server computer system receiving from a client computer system a user request of a cryptographic operation;
the multi-repository manager obtaining a set of references to remote cryptographic keys allowed to the user request from the plurality of repositories of remote cryptographic keys;
the multi-repository manager establishing a remote cryptographic key referenced in the set of references to remote cryptographic keys as the remote cryptographic key to be used for performing the cryptographic operation;
the multi-repository manager requesting performance of the cryptographic operation to the repository wherein the remote cryptographic key to be used is stored depending on the critical nature of the remote cryptographic key, said cryptographic operation to be performed by using said remote cryptographic key;
the multi-repository manager obtaining the result of the cryptographic operation from the repository of remote cryptographic keys that has performed the cryptographic operation;
the server computer system sending the result of the cryptographic operation to the client computer system.

14. Method according to claim 2, wherein a remote cryptographic key is allowed to the user request when said remote cryptographic key and the user request match a context-of-use rule of a set of context-of-use rules, and said matched context-of-use rule comprises a resulting action that indicates permission to use the remote cryptographic key.

15. Method according to claim 14, wherein each context-of-use rule of the set of context-of-use rules further comprises a priority, and wherein a remote cryptographic key is allowed to the user request when said remote cryptographic key and the user request match at least one context-of-use rule and the context-of-use rule of said at least one context-of-use rule having the highest priority comprises a resulting action that indicates permission to use the remote cryptographic key.

16. Method according to claim 14, wherein each context-of-use rule further comprises a user profile and a cryptographic key profile, and wherein a remote cryptographic key and the user request match a context-of-use rule when the user of the user request belongs to the user profile of said context-of-use rule and said remote cryptographic key belongs to the cryptographic key profile of said context-of-use rule.

17. Method according to claim 6, wherein each context-of-use rule further comprises a user profile and a cryptographic key profile, and wherein a remote cryptographic key and the user request match a context-of-use rule when the user of the user request belongs to the user profile of said context-of-use rule and said remote cryptographic key belongs to the cryptographic key profile of said context-of-use rule.

18. Method according to claim 15, wherein each context-of-use rule further comprises a user profile and a cryptographic key profile, and wherein a remote cryptographic key and the user request match a context-of-use rule when the user of the user request belongs to the user profile of said context-of-use rule and said remote cryptographic key belongs to the cryptographic key profile of said context-of-use rule.

19. Method according to claim 16, wherein each context-of-use rule further comprises a technical conditions profile, and wherein a remote cryptographic key and the user request match a context-of-use rule when the user of the user request belongs to the user profile of said context-of-use rule, said remote cryptographic key belongs to the cryptographic key profile of said context-of-use rule, and the technical conditions under which the user request has been performed belong to the technical conditions profile of said context-of-use rule.

* * * * *